United States Patent [19]

Kumazawa et al.

[11] Patent Number: 4,661,909

[45] Date of Patent: Apr. 28, 1987

[54] SCINTILLATION CAMERA WITH PULSE HEIGHT ANALYZER

[75] Inventors: Yoshihiko Kumazawa; Tsunekazu Matsuyama, both of Kyoto, Japan

[73] Assignee: Shimadzu Corporation, Kyoto, Japan

[21] Appl. No.: 553,784

[22] Filed: Nov. 21, 1983

[30] Foreign Application Priority Data

Jan. 31, 1983 [JP] Japan .................................. 58-14389

[51] Int. Cl.$^4$ ......................... G06F 15/42; G01T 1/20
[52] U.S. Cl. .................................... 364/414; 364/571; 250/363 S; 378/901
[58] Field of Search ................................ 364/413–415, 364/417, 571; 250/361 R, 363.1 R, 363.2 S; 378/4–5, 21–23, 901; 358/111

[56] References Cited

U.S. PATENT DOCUMENTS

| | | | |
|---|---|---|---|
| 4,179,607 | 12/1979 | Lange et al. | 250/363 S |
| 4,186,307 | 1/1980 | Tanaka et al. | 250/363 S |
| 4,200,793 | 4/1980 | Nagasawa et al. | 250/363 S |
| 4,212,061 | 7/1980 | Knoll et al. | 364/414 |
| 4,228,515 | 10/1980 | Genna et al. | 364/571 |
| 4,274,001 | 6/1981 | Nagasawa | 250/363 S |
| 4,281,382 | 7/1981 | Knoll et al. | 364/414 |
| 4,323,977 | 4/1982 | Arseneau | 364/571 |
| 4,415,982 | 11/1983 | Nishikawa | 250/363 S X |
| 4,529,883 | 7/1985 | Yamakawa et al. | 250/363 S |
| 4,538,227 | 8/1985 | Toraichi et al. | 364/414 |

FOREIGN PATENT DOCUMENTS 0007698 2/1980 European Pat. Off. .

OTHER PUBLICATIONS

Knoll et al., "Computer Correction of Camera Nonidealities in Gamma Ray Imaging", *IEEE Transactions on Nuclear Science*, vol. NS-29, No. 4, Aug. 1982, pp. 1272–1279.

*Primary Examiner*—Gary V. Harkcom
*Attorney, Agent, or Firm*—Fidelman, Wolffe and Waldron

[57] ABSTRACT

A radiation imaging apparatus provided with a pulse height analyzer for checking whether the pulse height of the energy signal produced in response to each scintillation event falls within an energy window set for the particular (x,y) coordinate position of the scintillation. The pulse height analyzer has a memory for storing a plurality of energy windows each for a particular one of the coordinate positions in the scintillator and each having a particular central level and a particular width such that the nonuniformity of the sensitivity of the detector due to the position-dependency of the energy signal and/or other causes can be corrected. A preliminary pulse height analyzer may be provided to increase the counting rate of energy signals useful for image production.

11 Claims, 16 Drawing Figures

Fig. 14

SCINTILLATION CAMERA WITH PULSE HEIGHT ANALYZER

BACKGROUND OF THE INVENTION

The invention generally relates to a radiation imaging apparatus and more particularly to a scintillation camera which has improved sensitivity and performance.

The scintillation camera is an instrument which gives an image of radionuclide distribution in a particular human organ or an local area thereof. The radionuclide is given to the human body usually by intravenous injection and taken up by a particular area of the human body. The camera includes a scintillator, which is actuated by the gamma rays emitted by the radionuclide to produce scintillations. A plurality of photoelectric elements arranged in close optical relation to the scintillator produce an electrical output in response to each of the scintillations.

A suitable electronic device translates the outputs of the photoelectric elements caused by each scintillation into electrical signals (to be referred to as the position signals or the signals X and Y) corresponding to the coordinate (x,y) positions where the scintillations have occurred in the scintillator and an electrical signal (to be referred to as the energy signal or the signal Z) whose pulse height corresponds to the energy level of each scintillation. If the energy signals produced for a certain period of time are plotted on a graph with the counted number taken on the ordinate and the energy level on the abscissa, an energy histogram or spectrum will be obtained, which has a single or a plurality of peaks depending upon the kind of radionuclide. The peak is commonly referred to as the photoelectric peak or photopeak.

The energy signal is applied to a pulse height analyzer, which checks if the level of the signal falls within a predetermined range defined by a high and a low signal level. The range will be referred to as the energy window. If the energy signal has a pulse height within the window, an image point is depicted on a CRT display in accordance with the calculated coordinate position of the scintillation in the scintillator. The image point is brighter at a position or picture element where the counted number of energy signals is higher and darker at a position or picture element where the counted number is lower.

Theoretically, the energy signals should have the same pulse height regardless of the position at which the radiations causing the signals strike the scintillator provided that the radiations have the same energy level. In other words, the energy histogram should have the same photopeak at all positions in the scintillator. Practically, however, this is not true, but it is inevitable that the photopeak of the energy histogram varies with the position where the scintillation occurs in the scintillator. The phenomenon may be referred to as the dependency of the energy signal on the position of the scintillation that has caused the energy signal, and more briefly, the position-dependency of the energy signal.

If one and the same window is applied to all energy signals caused by the scintillations that have occurred at different positions of the scintillator, the sensitivity of the camera is not uniform but differs at different parts of the scintillator.

Correction of the nonuniformity of sensitivity can be effected by changing the energy window for each of the coordinate positions in the scintillator in accordance with the photopeak shift of the energy histogram in each of the coordinate positions.

OBJECTS OF THE INVENTION

Accordingly, it is one object of the invention to provide a radiation imaging apparatus, wherein the nonuniformity of the sensitivity of the detector caused by the position-dependency of the energy signal can be corrected in real time.

In scintillation cameras, the sensitivity is affected by not only the position-dependency of the energy signal but also other causes such as the nonuniformity of the energy resolution at different positions in the scintillator and the spatial distortion of the positions of scintillations.

Another object of the invention is, therefore, to provide a radiation imaging apparatus, wherein the nonuniformity of the sensitivity caused otherwise than by the position-dependency of the energy signal can be corrected in real time.

Another object of the invention is to provide a radiation imaging apparatus, wherein the counting rate of energy signals useful for production of a radiation image is substantially increased.

An additional object of the invention is to provide a pulse height analyzer suitable for use in a radiation imaging apparatus.

The invention will be described in detail with reference to the accompanying drawing.

SUMMARY OF THE INVENTION

Briefly, in accordance with the invention when each of the scintillations produced by the radiations emitted from an object being observed is detected, a pair of position signals corresponding to the coordinate position of the scintillation in the scintillator and an energy signal having a pulse height corresponding to the energy level of the scintillation are produced.

A pulse height analyzer checks whether the pulse height of the energy signal falls within an energy window set for the particular coordinate position of the scintillation. The pulse height analyzer has a memory in which a plurality of energy windows are stored beforehand. Each of the energy windows corresponds to a particular one of the coordinate positions in the scintillator and has such a particular central level and a particular width defined by an upper and a lower level that the nonuniformity of the sensitivity of the detector due to the position-dependency of the energy signal or other causes can be corrected.

Upon occurrence of a scintillation event the position signals and the energy signal designate an address in the memory corresponding to the coordinate position and the energy level of the scintillation event to read out the data stored therein for checking whether the energy level is within the energy window for the coordinate position, and if the energy level is within the energy window, a pulse generator produces an unblanking signal to cause a bright point to appear at a corresponding coordinate position on a CRT display.

In order to reduce the number of addresses to be provided in the memory, those positions where the same photopeak appears in the energy histogram and therefore the same energy window can be applied may have a single common address in the memory.

Also in order to increase the counting rate of energy signals useful for image production, a preliminary pulse height analyzer may be used in addition to the previously mentioned main pulse height analyzer. The preliminary pulse height analyzer has a preliminary energy window defined by an upper level equal to the highest of all the upper levels of the energy windows of the main pulse height analyzer and a lower level equal to the lowest of all the lower levels of the energy windows thereof, so that no calculation is conducted for the positions of the scintillation events which cause those useless energy signals which have a pulse height outside the preliminary energy window, with resulting increase in the counting rate of those useful energy signals which have a pulse height within the energy windows set in the memory of the main pulse height analyzer.

DESCRIPTION OF THE PREFERRED EMBODIMENTS

Figure 1:
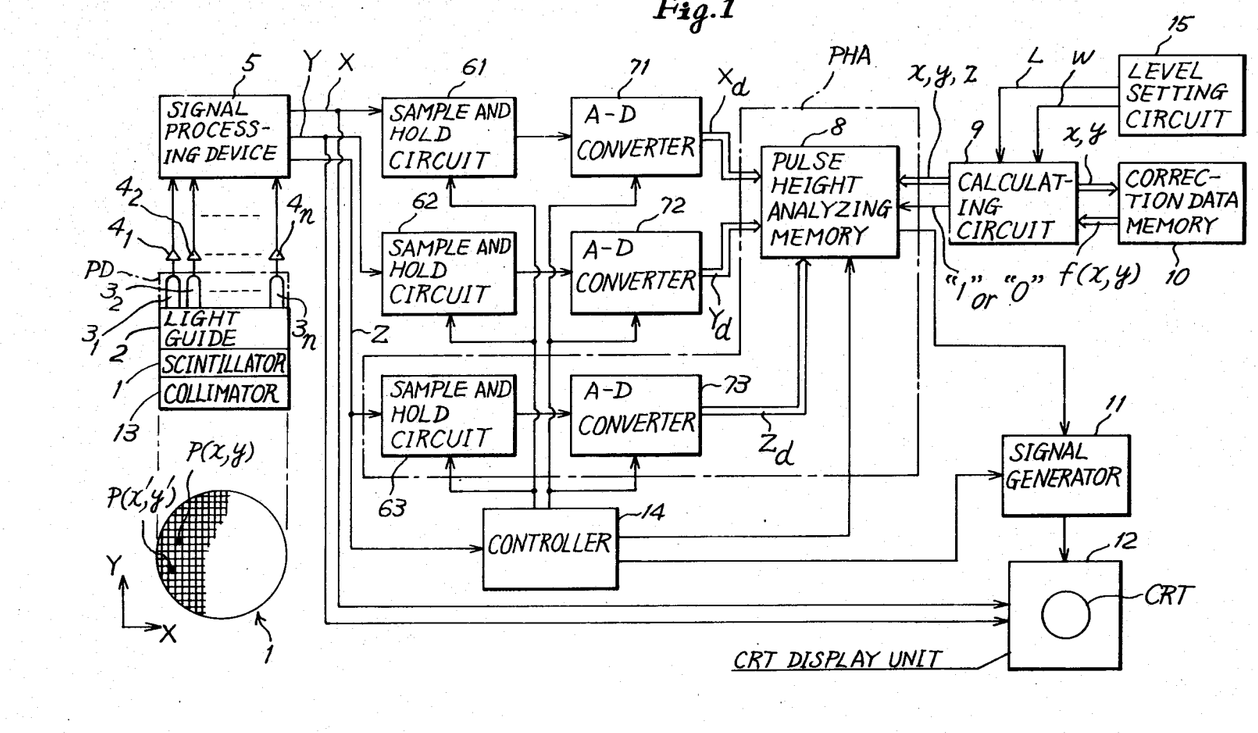
FIG. 1 is a schematic block diagram showing one embodiment of the invention.

Referring now to the drawings, there is shown in FIG. 1 a scintillator 1 in the form of a circular disk, at the upper side of which a plurality of photomultiplier tubes $3_1$ to $3_n$ to be collectively referred to as the photodetector PD are arranged with a light guide 2 being interposed therebetween.

The gamma rays emitted by a radionuclide dose introduced into a human body to be tested (not shown) pass through a collimator 13 to strike the under surface of the scintillator 1, and the scintillations produced are detected through the light guide 2 by the phototubes, which produce corresponding electrical outputs. As schematically shown in FIG. 1, the surface of the scintillator facing the detector surface is electrically divided into a plurality, say, 64×64 segments or coordinate positions P(x,y) in a rectangular coordinate system for the purpose to be described later.

The outputs of the photomultiplier tubes $3_1$ to $3_n$ are applied through a plurality of preamplifiers $4_1$ to $4_n$ to a signal processing device 5, which proudces position signals X and Y in accordance with the coordinate position P(x,y) where each scintillation occurs in the scintillator and also an energy signal Z having a pulse height proportional to the energy level of the scintillation. The structure so far is similar to that of a known scintillation camera.

The signals X, Y and Z from the signal processing device 5 are applied to sample and hold circuits 61, 62 and 63 (which will be referred to as the SH circuits), respectively, to be held therein. A-D converters 71, 72 and 73 convert the analog signals X, Y and Z held in the SH circuits 61, 62 and 63, respectively, to corresponding digital signals Xd, Yd and Zd, which are applied to a pulse height analyzing memory 8 to designate an address therein.

The memory 8 may comprise a dynamic random access memory (RAM), from the disignated address of which a 1-bit data stored therein beforehand in a manner to be described later is read out, and a signal generator 11 produces an unblanking signal if so instructed by the data. The SH circuit 63, the A-D converter 73 and the memory 8 constitute a pulse height analyzer PHA.

The unblanking signal as well as the previously mentioned position signals X and Y are applied to a CRT display unit 12 to produce a bright point at a coordinate position on CRT corresponding to the coordinate position P(x,y) where the scintillation has occurred in the scintillator. A controller 14 operates in response to the energy signal Z to produce timing signals to control the SH circuits 61 to 63, the A-D converters 71 to 73, the memory 8 and the signal generator 11.

Figure 2:
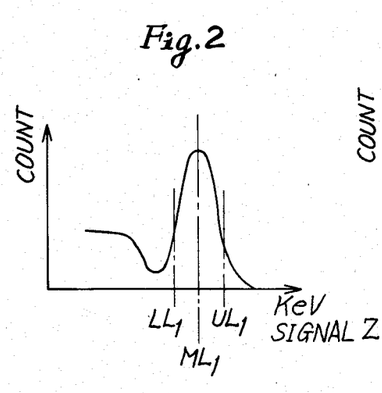
FIG. 2 is a graph showing an energy histogram obtained at a coordinate position of the scintillator.
Figure 3:
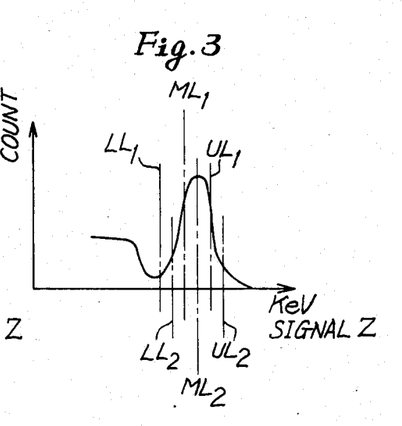
FIG. 3 is a graph showing an energy histogram obtained at a different coordinate position of the scintillator.

FIG. 2 shows an energy histogram of the signals Z caused by the scintillations that have occurred at a particular coordinate position P(x,y) in the scintillator, and FIG. 3 shows a similar energy histogram of the signals Z caused by the scintillations that have occurred at a different coordinate position P(x',y') in the scintillator. In both FIGS. 2 and 3 the energy value in KeV of the gamma rays that have caused the energy signals Z is taken on the abscissa while the number of energy signals Z counted is taken on the ordinate.

In FIG. 2 the centroid of the photopeak is at an energy level $ML_1$, with an energy window being defined between an upper level $UL_1$ and a lower level $LL_1$. In FIG. 3, however, the position where the radiation strikes the scintillator is different from that in FIG. 2, so that the photopeak centroid is shifted to a different energy level $ML_2$. If the same window as in FIG. 2 is used in FIG. 3, the sensitivity of the detector will certainly decrease. Therefore, a different energy window defined by a different upper level $UL_2$ and a different lower level $LL_2$ must be used.

Figure 4:
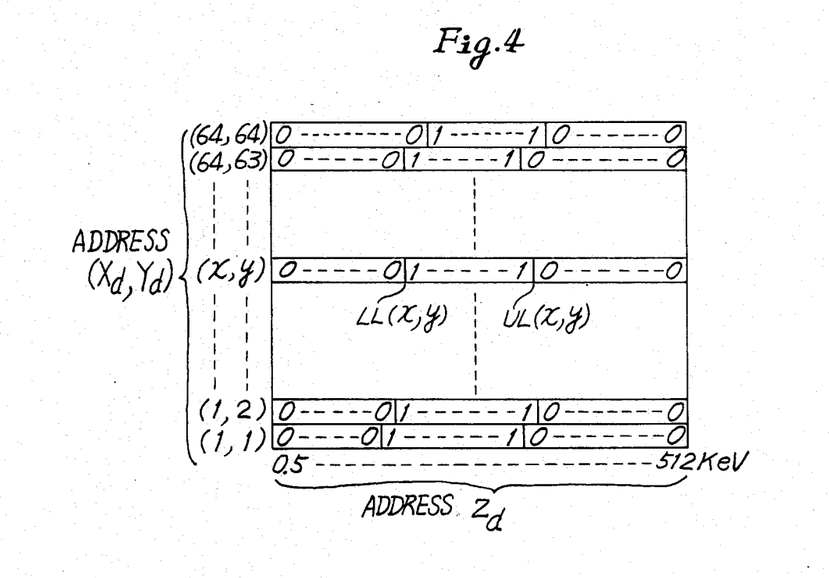
FIG. 4 schematically shows the contents of the memory of the pulse height analyzer used in the embodiment of FIG. 1.

The memory 8 comprises by way of example 64×64×1024 addresses to accommodate 1024 channels for each of 64×64 pixels (picture elements) of the CRT display 12 corresponding to the coordinate positions P(x,y) on the previously mentioned scintillator surface, each channel having a width of 0.5 KeV so that all the 1024 channels cover the energy range of 0 to 512 KeV. The memory 8 is schematically shown in FIG. 4. In each horizontal row there are provided 1024 addresses corresponding to the 1024 channels each of a 0.5 KeV width, and there are 64×64 rows arranged along the Y axis corresponding to the 64×64 pixels or coordinate positions P(x,y).

In each of the 64×64×1024 addresses a 1-bit data of "1" or "0" is written prior to measurement as a result of the following calculations in accordance with preselected conditions for pulse height analysis such as, for example, the energy value L corresponding to the centroid of a selected energy window and the energy value W corresponding to the width of the energy window.

At first, the photopeak shift of the energy histogram obtained from each coordinate position P(x,y) relative to the photopeak of the energy histogram obtained from the entire scintillator surface is measured beforehand so as to be stored in a correction data memory 10 which may comprise a programmable read only memory (PROM). Let the data of the photopeak shift be expressed as f(x,y). A calculating circuit 9 such as for example a microcomputer performs the following calculations to obtain the central level ML(x,y) and the upper and lower limit levels LL(x,y) and UL(x,y) of the energy window for each coordinate position, with the values L and W being provided by a suitable value setting circuit 15:

$$ML(x,y)=L\times[1+f(x,y)], \qquad (1)$$

$$UL(x,y)=ML(x,y)\times(1+W/2), \qquad (2)$$

$$LL(x,y)=ML(x,y)\times(1-W/2). \qquad (3)$$

When the values UL(x,y) and LL(x,y) for each coordinate position P(x,y) have been obtained from the above calculations, a 1-bit data "1" is written into those of the addresses Zd which cover the range between LL(x,y) and UL(x,y), that is, LL(x,y)≦Zd≦UL(x,y) for each of the 64×64 coordinate positions, whereas a 1-bit data "0" is written into the other addresses Zd outside the range, as shown in FIG. 4. The 1-bit data "1" or "0" expresses the result of pulse height analysis. The 1-bit data "1" expresses that the pulse height of an energy signal caused by a scintillation at a particular coordinate position P(x,y) of the scintillator falls within a particular window for that particular coordinate position, whereas the 1-bit data "0" expresses that the pulse height of an energy signal falls outside the window.

Figure 4A:
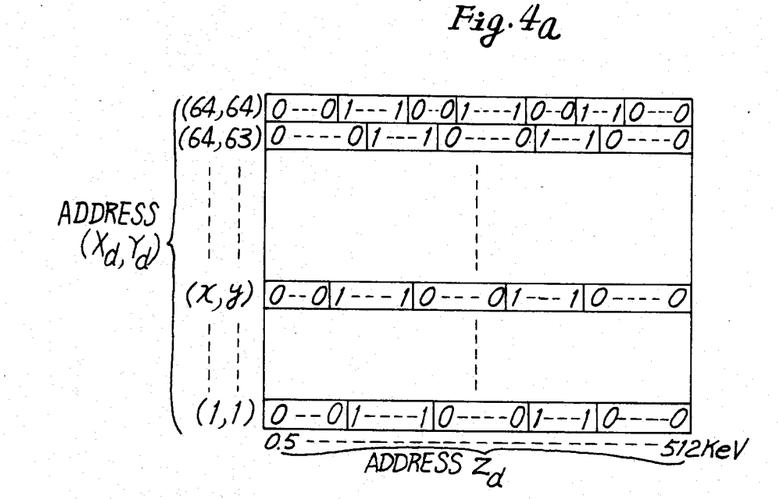
FIGS. 4a, 6, 13 and 15 schematically show the contents of the pulse height analyzing memories used in the different embodiments of the invention.

In FIG. 4, a single window is set for each position P(x,y). For measurement of a multiple-photopeak spectrum there may be provided a plurality of windows for each position P(x,y), as shown in FIG. 4a. In accordance with the invention it is not necessary to provide a plurality of pulse height analyzers as was necessary in the prior art.

When a scintillation event occurs at a certain position in the scintillator, position signals X and Y and an energy signal Z are produced, and the corresponding digital signals Xd, Yd and Zd are given as an address data to the memory 8, whereupon the 1-bit data "1" or "0" stored in the designated address is read out. When the data that has been read out is "1", the energy signal has an energy level falling within the window set for the particular position, so that the signal generator 11 produces an unblanking signal.

If the data that has been read out is "0", the energy signal has an energy level falling outside the window, so that no unblanking signal is produced by the signal generator 11.

As previously mentioned, different coordinate positions P(x,y) of the scintillator have different energy windows specific to the positions. When another scintillation event occurs at a different position, a different address is designated so that a different window set for that particular position is applied to the level of the energy signal caused by the scintillation. Thus, the non-uniformity of the sensitivity caused by the position-dependency of the energy signal can be compensated for in real time.

The previously described equation (1) presupposes that the position-dependency of the energy signal is independent of the kind of the radionuclide used for a particular measurement. Any errors caused by this approximation are negligible with a conventional optical system.

If the errors are not negligible, they can be removed by adding a correction factor to the equation (1). The value f(x,y) of the photopeak shift in the equation (1) can be obtained beforehand for each position P(x,y) by measurement with Technetium-99m having a photopeak at 140 KeV used as a standard. If the central energy level of the window for the standard radionuclide is given as Lo, the central energy level ML(x,y) of the window for a given different kind of radionuclide can be obtained from the following equation:

$$ML(x,y)=L\times[1+g(L-Lo)\times f(x,y)], \qquad (4)$$

wherein g(L−Lo) is a function of L−Lo, which can approximately be given as:

$$g(L-Lo)=1+k\times(L-Lo), \qquad (5)$$

wherein k is a constant.

In scintillation cameras the position-dependency of the energy signal chiefly depends upon the arrangement of the photomuliplier tubes with respect to the scintillator, so that the same photopeak shift in the energy histogram tends to appear cyclically at different coordinate positions of the scintillator.

Figure 5:
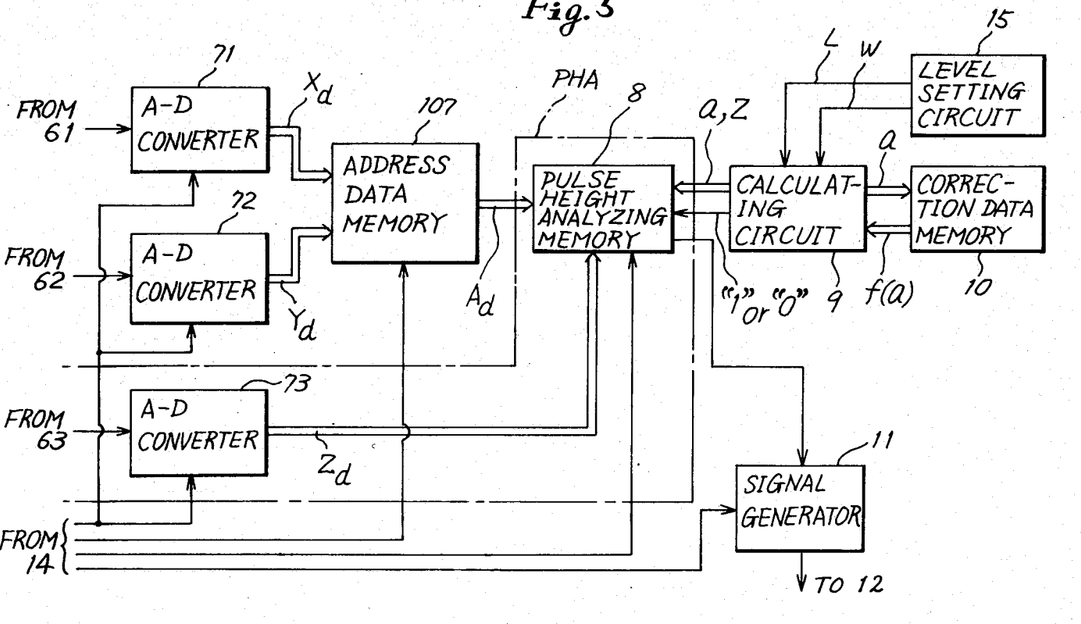
FIGS. 5, 7, 8, 9, 10, 11 and 14 are schematic block diagrams similar to FIG. 1 but showing different embodiments of the invention.

FIG. 5 shows another embodiment of the invention, wherein the positions where the same photopeak shift appears have a common address in the pulse height analyzing memory, thereby to enable use of a memory of a lower capacity, simplification of address and reduction of the time required for calculation of data to be written into the memory.

In FIG. 5 the same reference symbols as in FIG. 1 designate corresponding components, so that no explanation is given to them except when necessary. The digital signals Xd and Yd from the A-D converters 71 and 72 designate an address in an address data memory 107. The address data Ad read out from the memory 107 and the digital energy signal Zd from the A-D converter 73 are applied to a pulse height analyzing memory 8 to designate an address therein. In the embodiment of FIG. 5, those of the positions P(x,y) where the same photopeak shift appears are represented by a single position P(a), and the address data memory 107 converts the address (Xd, Yd) of any of the positions P(x,y) to the address Ad of the single representative position P(a).

Figure 6:
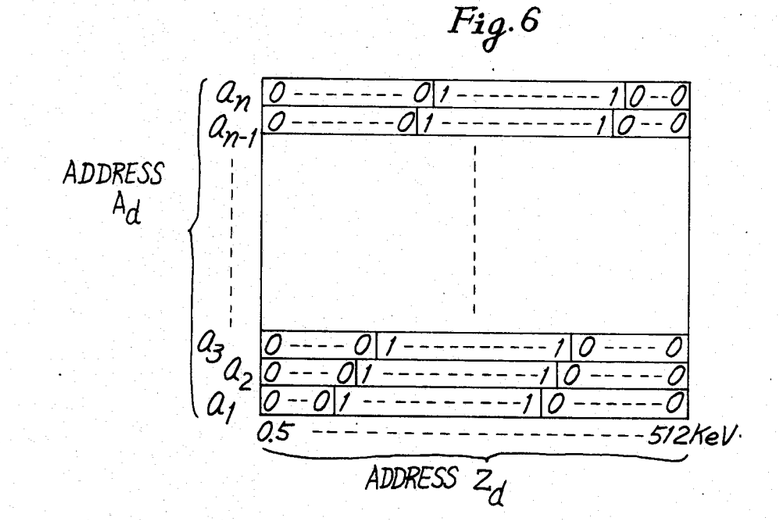

As shown in FIG. 6, in the memory 8 the 1-bit data "1" or "0" is written in each of the addresses Ad each corresponding to a position P(a) representing a group of positions P(x,y) where the same photopeak appears. The writing operation is performed by a calculator 9 and a correction data memory 10 in substantially the same manner as in FIG. 1 except that the position P(x,y) is converted to a representative position P(a) and the data of the photopeak shift f(x,y) is replaced by f(a).

In scintillation cameras of the type the present invention is concerned with, the sensitivity is adversely affected by not only the position-dependency of the energy signal but also the energy resolution of the detector, which also varies with the coordinate position P(x,y) where scintillations occur in the scintillator. A low energy resolution means that the energy signals caused by radiations of the same energy level have widely different pulse heights, so that many of the energy signals fall outside a particular window, with resulting decrease in the number of the energy signals counted and consequently deterioration of the sensitivity of the detector.

To compensate for the sensitivity deterioration the width of the energy window may be changed in accordance with the energy resolution of the detector available at each of the coordinate positions P(x,y) in the scintillator.

In addition to the variation of the energy resolution of the detector with the position of scintillation, there is a problem of spatial distortion of the position of scintillation. It is practically impossible to correctly determine each and every coordinate position by calculation without causing spatial distortion of the positions, so that those scintillation events which have occurred at a particular position tend to be erroneously attributed to a different position. This causes a uniform original image to be reproduced as an uneven image having intermingled bright and dark portions. To prevent formation of such uneven radiation images it is necessary to decrease the number of scintillation events counted for the bright portions of the reproduced radiation image by reducing the width of the energy windows for the bright image portions and inversely to increase the number of scintillation events counted for the dark portions of the image by enlarging the width of the energy windows for the dark image portions.

Figure 7:
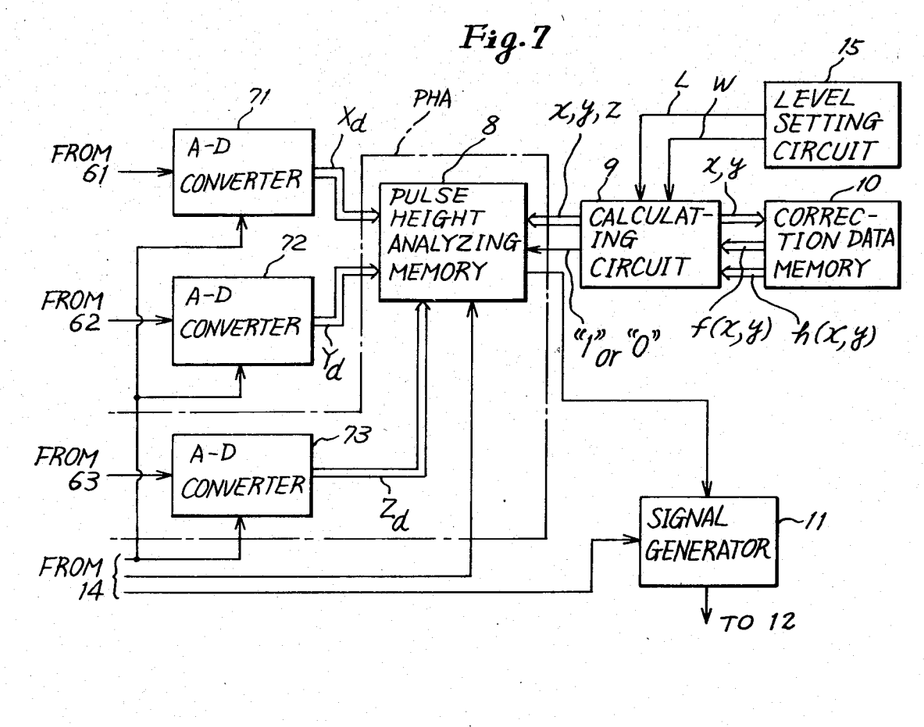

FIG. 7 shows a third embodiment of the invention in which the width of the energy window is changed with the position P(x,y) of scintillation. In FIG. 7 the same reference symbols as in FIG. 1 denote corresponding component elements or parts, and the other components which are provided in FIG. 1 are provided also in the embodiment of FIG. 7 though not shown here.

The data to be written into the memory 8 are obtained by calculations conducted in accordance with the following equations:

$$ML(x,y) = L \times [1 + f(x,y)], \qquad (6)$$

$$UL(x,y) = ML(x,y) \times (1 + W/2 \times h(x,y)), \qquad (7)$$

$$LL(x,y) = ML(x,y) \times (1 - W/2 \times h(x,y)). \qquad (8)$$

The equation (6) is the same as the previously described equation (1) while the equations (7) and (8) are obtained by adding a correction factor h(x,y) to the previously described equations (2) and (3), respectively.

The factor h(x,y) comprises the data for correcting the nonuniformity of the sensitivity caused otherwise than by the position-dependency of the energy signal and is determined beforehand by, for example, the iterative method to have such a value for each position P(x,y) that the image obtained initially with h(x,y)=1 for each position P(x,y) is corrected for any remaining unevenness or nonuniformity. The data h(x,y) for each position P(x,y) is stored in the correction data memory 10 together with the data f(x,y). In order to eliminate any influence by scattered gamma rays correction by h(x,y) could be applied to only the upper level UL(x,y) of the width of the energy window and not the lower level LL(x,y).

The operation of the embodiment of FIG. 7 is substantially the same as that of FIG. 1 so that no further explanation will be necessary.

If the kind of radionuclide used is to be taken into consideration, a correction factor g(L−Lo) should be added to the equation (6) just as in the previously described equation (4). In a similar manner it is possible to correct the width of the energy window by the following equations in accordance with the kind of radionuclide used. Strictly speaking, it is preferable to change the correction factor h(x,y) with the width of the energy window used for a particular measurement.

$$UL(x,y) = ML(x,y) \times (1 + W/2 \times h'(x,y)), \qquad (9)$$

$$LL(x,y) = ML(x,y) \times (1 - W/2 \times h'(x,y)), \qquad (10)$$

where $$h'(x,y) = h(x,y) \times P(L - Lo) \times Q(W - Wo). \qquad (11)$$

The value h(x,y) is obtained with Technetium-99m used as the standard, and with the energy window having a particular central level Lo and a particular width Wo, for example, 20% of the central level. P(L−Lo) and Q(W−Wo) are functions of L−Lo and W−Wo, respectively.

Figure 8:
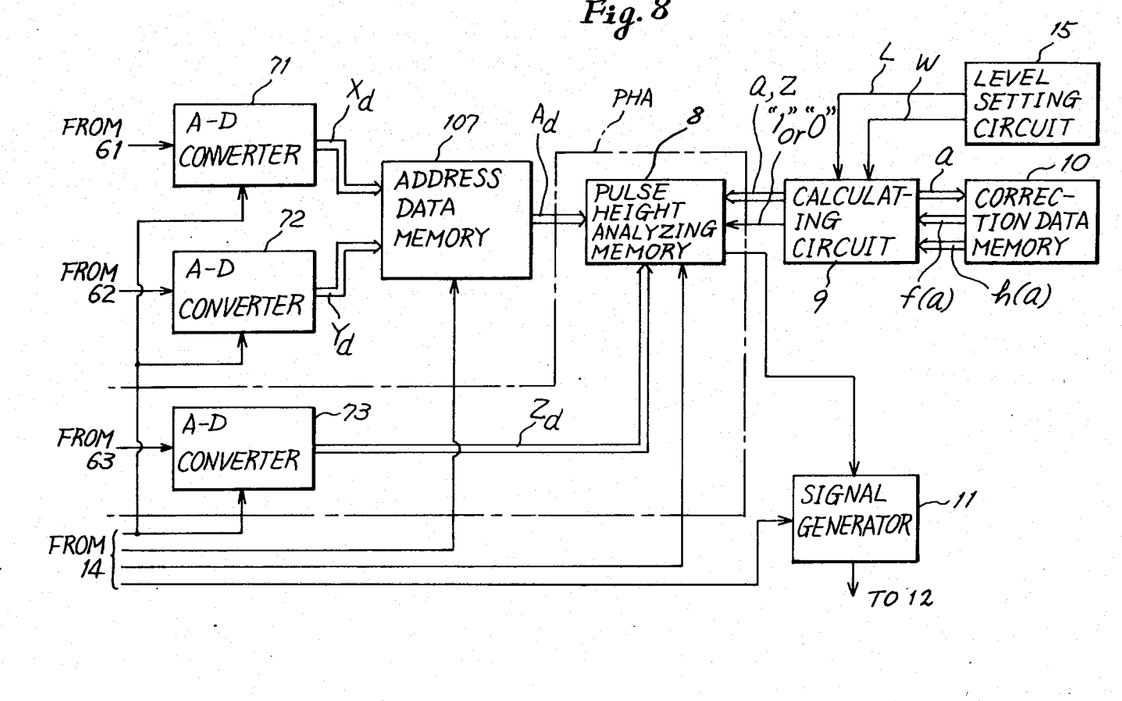

FIG. 8 shows a fourth embodiment of the invention, wherein the positions P(x,y) in the scintillator where the same energy window is to be used have a common address in the pulse height analyzing memory 8 as in FIG. 5. In FIG. 8 the same reference symbols as in FIG. 5 designate corresponding components, and the other components which are not shown in FIG. 8 are the same as the FIG. 1.

The construction of the memory 8 is the same as that shown in FIG. 6 and the operation of the embodiment of FIG. 8 is substantially the same as that of FIG. 5 except that the data h(a) is added to the correction data memory 10.

Figure 9:
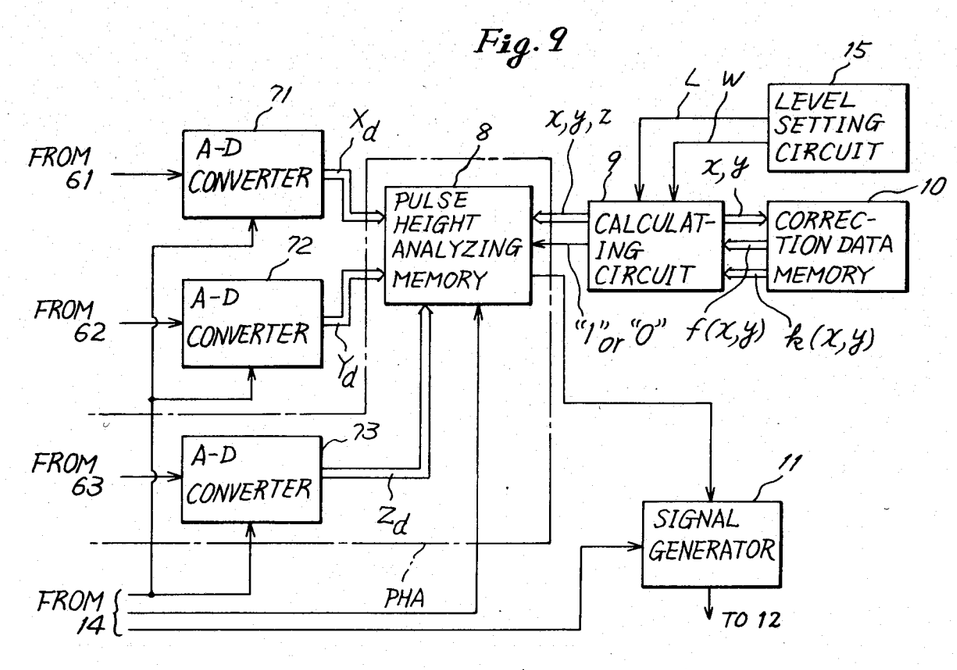

In the embodiments of FIGS. 7 and 8, to correct the nonuniformity of the sensitivity the width of the energy window is changed with the position P(x,y) of scintillation. In the embodiment of FIG. 9, the central level ML(x,y) of the energy window is shifted from the optimum value by adding a correction factor k(x,y) to the equation (1) to obtain the following equation for the central level of the energy window:

$$ML(x,y) = L \times [1 + f(x,y) + k(x,y)]. \qquad (12)$$

The upper and lower levels UL(x,y) and LL(x,y) of the window can be obtained by the previously described equations (2) and (3). The correction factor k(x,y) is determined beforehand by the iterative method to have such a value for each position P(x,y) that the image obtained initially by the equations (12) (2) and (3) with k(x,y)=0 for each position P(x,y) is corrected for any remaining unevenness or nonuniformity.

In order to eliminate any influence by Compton scattering it is preferable to lower the sensitivity in those positions where the sensitivity is relatively high by making k(x,y)≧0 in equation (12), that is, by shifting the central level of the energy window to the high energy side.

In FIG. 9, the same reference symbols as in FIG. 1 or 7 denote corresponding components, and those components which are not shown in FIG. 9 are the same as in FIG. 1. The operation of the embodiment of FIG. 9 is substantially the same as that of the embodiment of FIG. 7 except that the factor h(x,y) for correcting the width of the energy window in FIG. 7 is replaced in FIG. 9 by the factor k(x,y) for correcting the central level of the energy window.

Since the position-dependency of the energy signal depends on the kind of the radionuclide used for the measurement, when different kinds of radionuclides are used, the factor f(x,y) in equation (12) should be replaced by $$f'(x,y) = f(x,y) \times g(L - Lo). \quad (13)$$

However, the conventional optical systems f'(x,y) is nearly equal to f(x,y), so that the above replacement may not be required.

On the contrary, the energy resolution of the detector depends greatly upon the energy of the radionuclide used, and the correction factor k(x,y) tends to change the sensitivity due to the correlation between the width of the energy window used and the energy resolution even if the factor k(x,y) remains of the same value. Therefore, when different kinds of radionuclides are used, the factor k(x,y) must be replaced by $$k'(x,y) = k(x,y) \times R(L - Lo) \times S(W - Wo), \quad (14)$$

where R(L−Lo) and S(W−Wo) are the functions of L−Lo and W−Wo, respectively. Then instead of the equation (12) the following equation (15) is used:

$$ML(x,y) = L \times [1 + f'(x,y) + k'(x,y)]. \quad (15)$$

Figure 10:
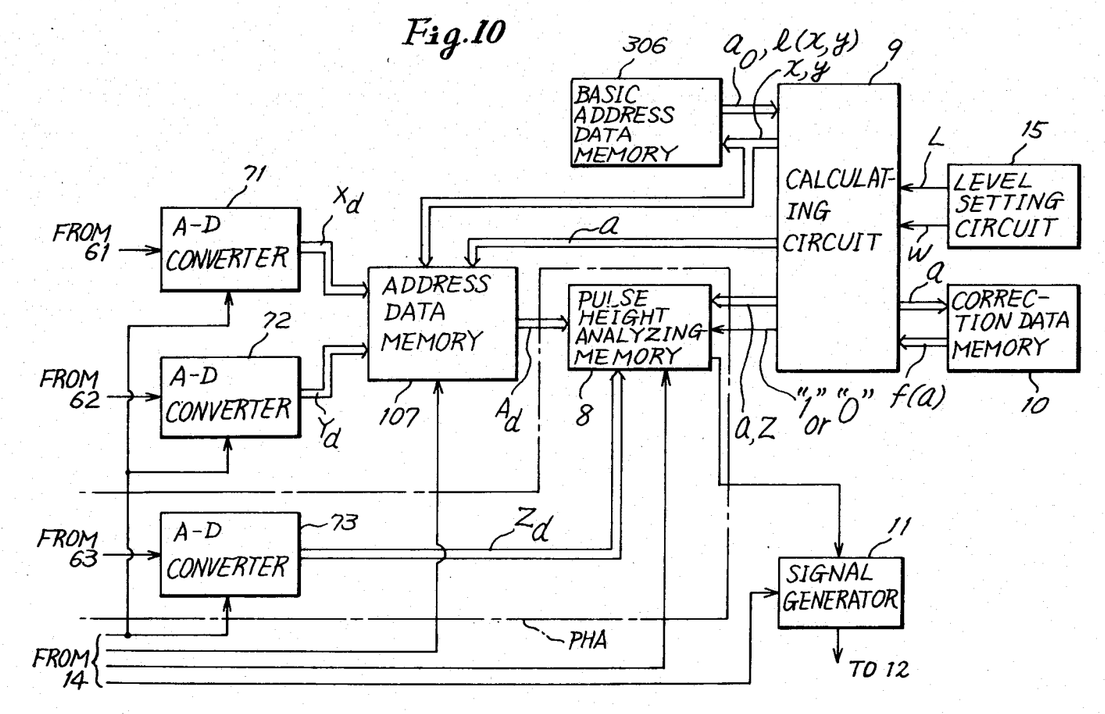

FIG. 10 shows a sixth embodiment of the invention, wherein the same reference symbols as in FIG. 1 or 8 designate corresponding components, and those components which are not shown in FIG. 10 are the same as in the embodiment of FIG. 1. This embodiment of FIG. 10 is different from FIG. 9 in that the positions P(x,y) in the scintillator where the same energy window is to be applied have a common address in the memory 8 as in the embodiment of FIG. 8.

In the embodiment of FIG. 10 the following equations are used:

$$a(x,y) = a_o(x,y) + l(x,y), \quad (16)$$

$$ML(x,y) = L \times (1 + f(a)). \quad (17)$$

In the above equation (16) $a_o(x,y)$ is the address data for correcting the nonuniformity of the sensitivity caused by the position-dependency of the energy signal at each of the coordinate positions P(x,y) while l(x,y) is the address data for correcting the nonuniformity due to other causes. These data are stored in a basic address data memory 306.

Initially with l(x,y)=0 for all of the positions P(x,y) correction is conducted by using the equations (16) (17) and (2) (3). Then the data l(x,y) are obtained in the same manner as that in which the data k(x,y) are obtained in the embodiment of FIG. 9. Also the data l(x,y) must be modified in accordance with the kind of the radionuclide used and/or the width of the energy window just as in the case of k(x,y).

In the above embodiments, the position of each and every scintillation event is calculated, so that even those scintillations which have an energy level falling outside the energy window are processed uselessly while those scintillations whose energy levels fall within the window cannot be processed for determination of their positions, with resulting reduction of the counting rate of the energy signals.

Figure 11:
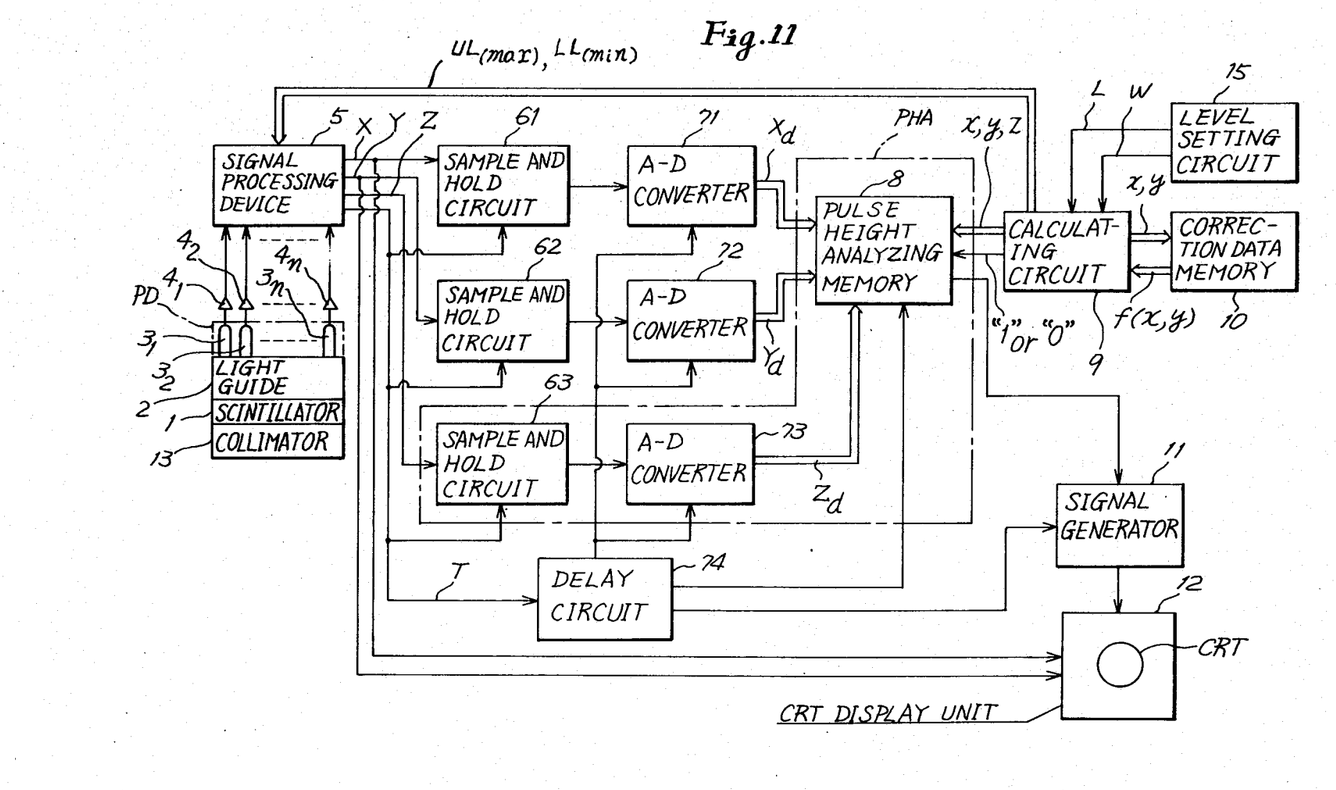
Figure 12:
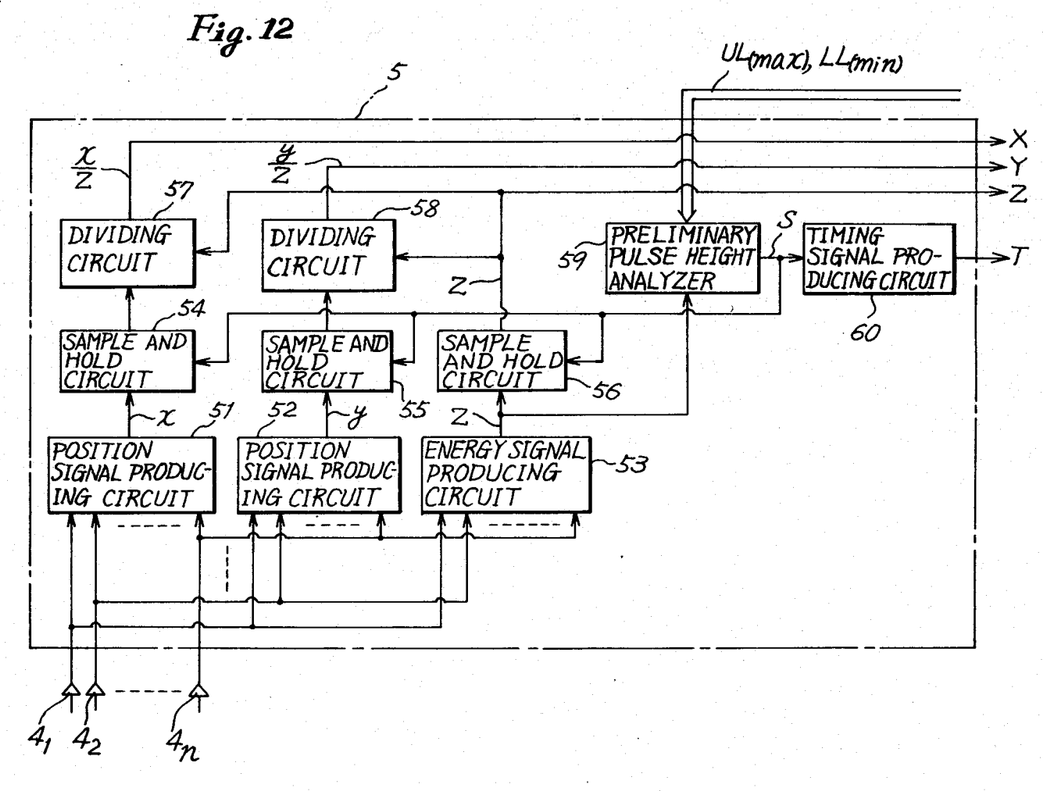
FIG. 12 is a schematic block diagram showing in detail the signal processing device in the embodiment of FIG. 11.
Figure 13:
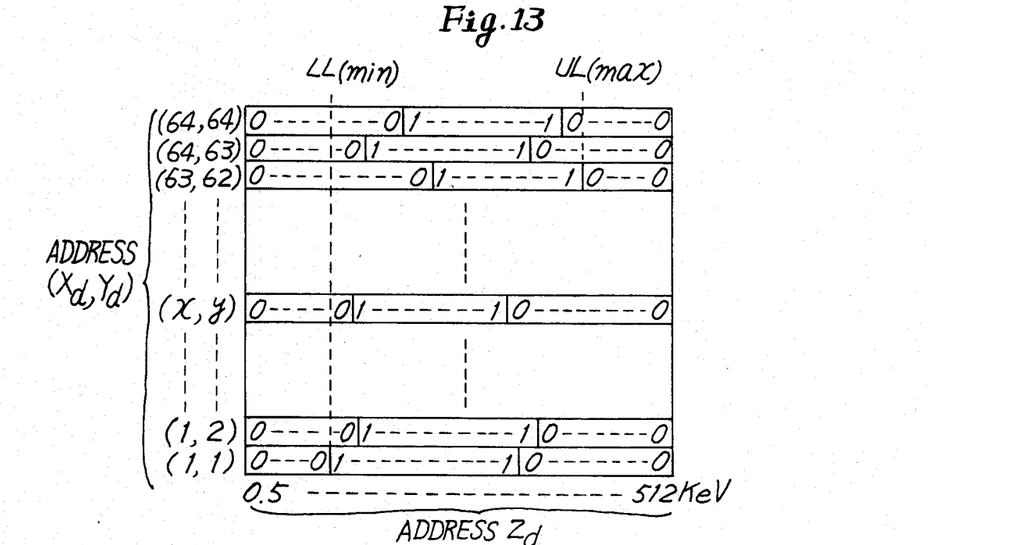

FIGS. 11 to 13 show a seventh embodiment of the invention directed toward solving the problem. In FIGS. 11 to 13 the same reference symbols as in the previous figures denote corresponding components so that no explanation will be given to them except when necessary.

Turning to FIG. 13 there is schematically shown a pulse height analyzing memory 8 which includes a plurality of energy windows each for one of the coordinate positions P(x,y) in the scintillator and defined by the addresses having the 1-bit data "1" stored therein. As previously mentioned, each energy window has an upper level UL(x,y) and a lower level LL(x,y). Let the maximum level of the upper levels of all the energy windows in the memory 8 and the minimum level of the lower levels thereof be expressed as UL(max) and LL(min), respectively. The calculating circuit 9 previously determines the values UL(max) and LL(min) and applies the data to the signal processing device 5.

As shown in FIG. 12, the device 5 comprises by way of example a circuit 51 for producing a position signal x, a circuit 52 for producing a position signal y, a circuit 53 for producing the energy signal Z, sample and hold circuits 54, 55, 56, dividing circuits 57, 58, a preliminary pulse height analyzer 59 and a timing signal producing circuit 60.

The preliminary pulse height analyzer 59 has an energy window the upper and lower levels of which are set in proportion to the levels UL(max) and LL(min), respectively. Only when the energy signal Z falls within this window, the analyzer 59 produces an output signal S, which causes the timing signal producing circuit 60 to proudce a timing signal T after a short delay. The signal S also causes the sample and hold circuits 54, 55 and 56 to take in the signals X, Y and Z from the signal producing circuits 51, 52 and 53, respectively. Unless the signal S is produced, the circuits 54 to 56 do not take in the signals from the circuits 51 to 53, so that the circuits 54 to 56 do not operate uselessly. In other words, since the circuits 54 to 56 do not operate uselessly for calculation of those positions of scintillations which need not be determined, they can operate usefully for calculation of the positions of scintillations which must be determined, so that the counting rate of energy signals is increased.

The timing signal T controls the operation of the SH circuits 61, 62 and 63 to take in the signals X, Y and Z, respectively. The timing signal T is also applied to a delay circuit 74 and after a predetermined time delay, controls the A-D converters 71 to 73, the memory 8 and the signal generator 11.

The operation of this seventh embodiment is substantially the same as that of the first embodiment shown in FIG. 1 and is obvious to those who have read the preceeding pages, so that no explanation will be given.

Figure 14:
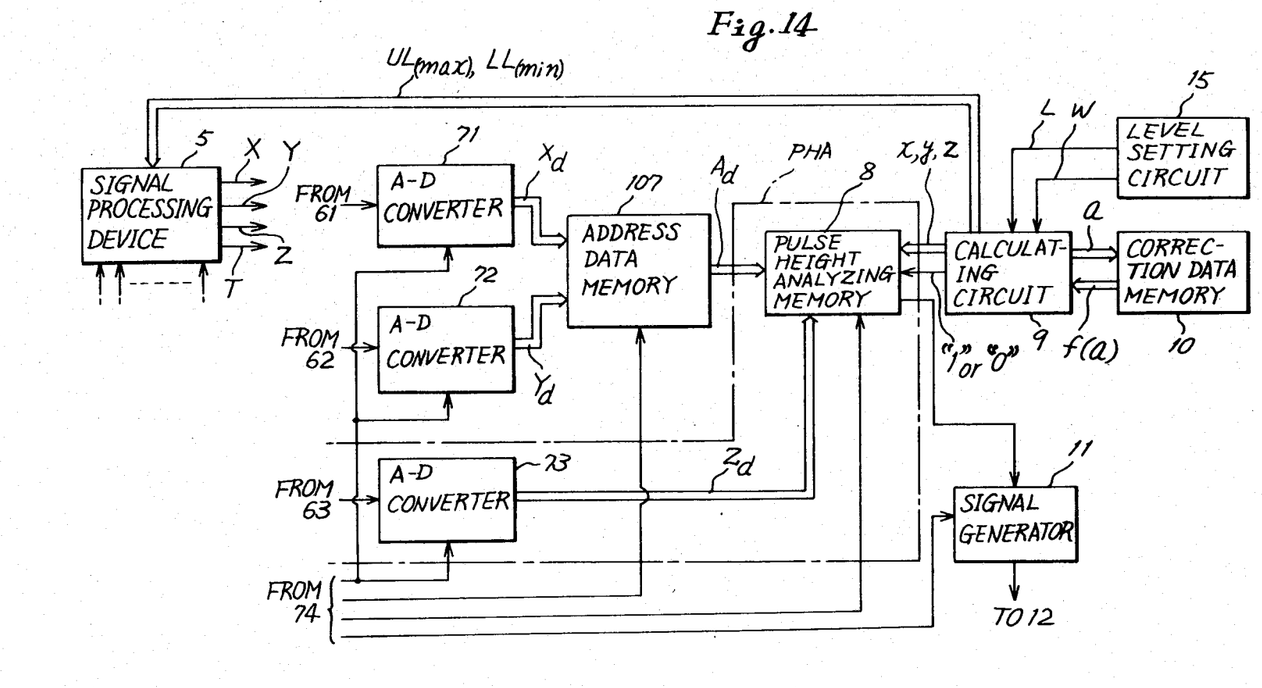
Figure 15:
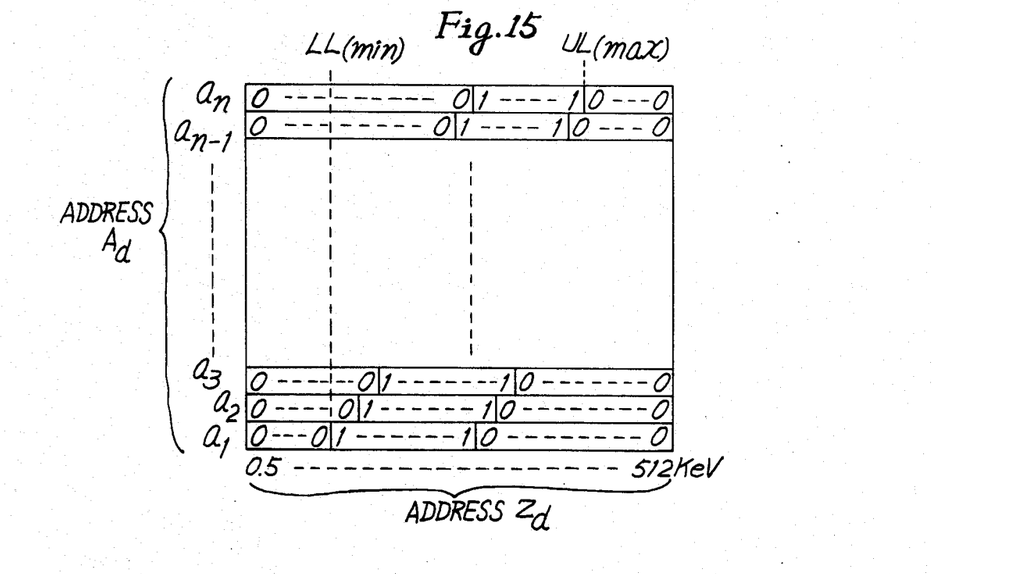

FIGS. 14 and 15 show an eighth embodiment of the invention, wherein the positions P(x,y) in the scintillator where the same photopeak shift appears in the energy histogram have a common address in the pulse height analyzing memory for the same purposes as in the embodiment of FIG. 5 or 8.

In FIGS. 14 and 15 the same reference symbols as in the previous figures designate corresponding components, so that no explanation is given to them except when necessary, and though not shown in FIG. 14, it is understood that the same components as in FIG. 11 are provided in FIG. 14.

The digital signals Xd and Yd from the A-D converters 71 and 72 designate an address in an address data memory 107. The address data read out from the memory 107 and the digital energy signal Zd from the A-D converter 73 are applied to a pulse height analyzing memory 8 to designate an address therein. As in the embodiment of FIG. 5 those of the positions P(x,y) where the same photopeak shift appears are represented by a single position P(a), and the address data memory 107 converts the address (Xd, Yd) of any of the group of positions P(x,y) to the address Ad of the single representative position P(a). In the memory 8 the 1-bit data "1" or "0" is written in each of the addresses Ad each corresponding to a position P(a) representing a group of positions P(x,y). The writing operation is performed by a calculator 9 and a correction data memory 10 in substantially the same manner as in FIG. 11 except that the position P(x,y) is converted to a representative position P(a) and the data of the photopeak shift f(x,y) are replaced by f(a).

In order to improve the accuracy of pulse height analysis or that of correction of the nonuniformity of the energy signal without increasing the capacity of the memory 8, it is possible to process the energy signal Z in analog or digital form by subtraction and/or multiplication so as to use the signal as the address signal Zd for the memory.

Also the memory 8 may be divided into several sections or blocks, each of which corresponds to a different kind of radionuclide and in each of which energy windows are provided in substantially the same manner as in the above-mentioned embodiments. With this arrangement it is possible to conduct measurements with different kinds of radionuclides by detecting from which of the memory blocks the data that has caused the unblanking siganl has been obtained.

Instead of dividing the memory into several blocks in the above-mentioned manner, the memory may be so arranged as to accept and store data of 2 or more bits. For example the 2-bit data of "01", "10" and "11" are written in the addresses within a first, a second and the third window, respectively, while the 2-bit data of "00" is written in the addresses outside the windows. With this arrangement it is possible to make measurements by using a radionuclide which shows a multiple-photopeak energy histogram or different kinds of radionuclides which show different energy histograms.

Thus the present invention has successfully provided a scintillation camera in which the sensitivity of the detector is greatly improved by eliminating the nonuniformity of sensitivity which would otherwise be caused by the position-dependency of the energy signal and other causes. The data for pulse height analysis of the energy signals are stored in the addresses of a memory which are designated by the position signals and the energy signal produced upon occurrence of a scintillation event, so that the analyzer substantially functions as a multiple-channel analyzer having a great degree of freedom for conditions for setting the energy window.

Whenever a scintillation event occurs, the data are read out from that one of the addresses designated by the position signals and energy signal caused by the scintillation so as to decide whether or not the energy level of the scintillation is within the energy window set for the position of the scintillation, so that it is possible to correct in real time the nonuniformity of the sensitivity of the detector caused by the position-dependency of the energy signal or other causes.

The counting ratio of energy signals useful for image production has also been increased.

What we claim is:

1. A radiation imaging apparatus comprising:

(a) means for producing a scintillation in response to each of a plurality of radiation events obtained from an object being observed;

(b) means for detecting said scintillation to produce coordinate position signals corresponding to a coordinate position of said scintillation in said scintillation producing means and an energy signal corresponding to an energy level of said scintillation;

(c) means for analyzing said energy signal to produce an output signal when said energy signal has a pulse height falling within at least one predetermined energy window, said analyzing means comprising a memory having a plurality of address groups with each group corresponding to at least one of plural coordinate positions and designatable by a set comprising said position signals and said each group including a plurality of addresses with each address designatable by an energy signal with each address of each said energy window being predefined by data of a binary one therein;

(d) means for storing correction data for correcting a nonuniformity of detection sensitivity of said scintillation in said coordinate positions; and (e) means for conducting predetermined calculations with said correction data to provide data for defining at least one energy window for each of said positions and causing said energy window defining data to be written into said addresses of said memory corresponding to each of said positions;

(f) whereby said set of position signals and energy signal produced in response to a scintillation event designate one of said memory addresses for read out of said window defining data from said one address in order to determine whether a pulse height of said energy signal is within said energy window.

2. The apparatus of claim 1, wherein said memory has at least one common group of addresses which store data for defining at least one energy window for more than one of said coordinate positions.

3. The apparatus of claim 1, wherein said means for conducting predetermined calculations with said correction data provides data for defining more than one energy window for each of said positions.

4. The apparatus of claim 1, wherein said correction data comprise data for correcting a nonuniformity of sensitivity caused by position-dependency of the energy signal.

5. The apparatus of claim 4, wherein said correction data further include additional data for correcting nonuniformity of said sensitivity caused otherwise than by the position-dependency of the energy signal.

6. The apparatus of claim 5, wherein said additional correction data comprise data for correcting a nonuniformity of the sensitivity caused by variation of energy resolution with the positions of scintillation.

7. The apparatus of claim 5, wherein said additional correction data comprise data for correcting a nonuniformity of the sensitivity caused by spatial distortion of the positions of scintillations.

8. The apparatus of claim 5, wherein said additional correction data comprise data for shifting a central level of said energy window.

9. The apparatus of claim 5, wherein said additional correction data comprise data for changing a width of said energy window.

10. The apparatus of claim 1, wherein said correction data are modified in accordance with kinds of radiation emitting material to be used for measurement.

11. The apparatus of any of the preceding claims, and further comprising means for preliminarily analyzing said energy signal, said preliminary analyzing means comprising a preliminary energy window having an upper level corresponding to a highest of upper levels of said energy windows in said memory and a lower level corresponding to a lowest of lower levels of said energy windows and so arranged as to produce a control signal to cause said position signal producing means to produce position signals only when the pulse height of said energy signal falls within said preliminary energy window.

* * * * *